Figure 1A:
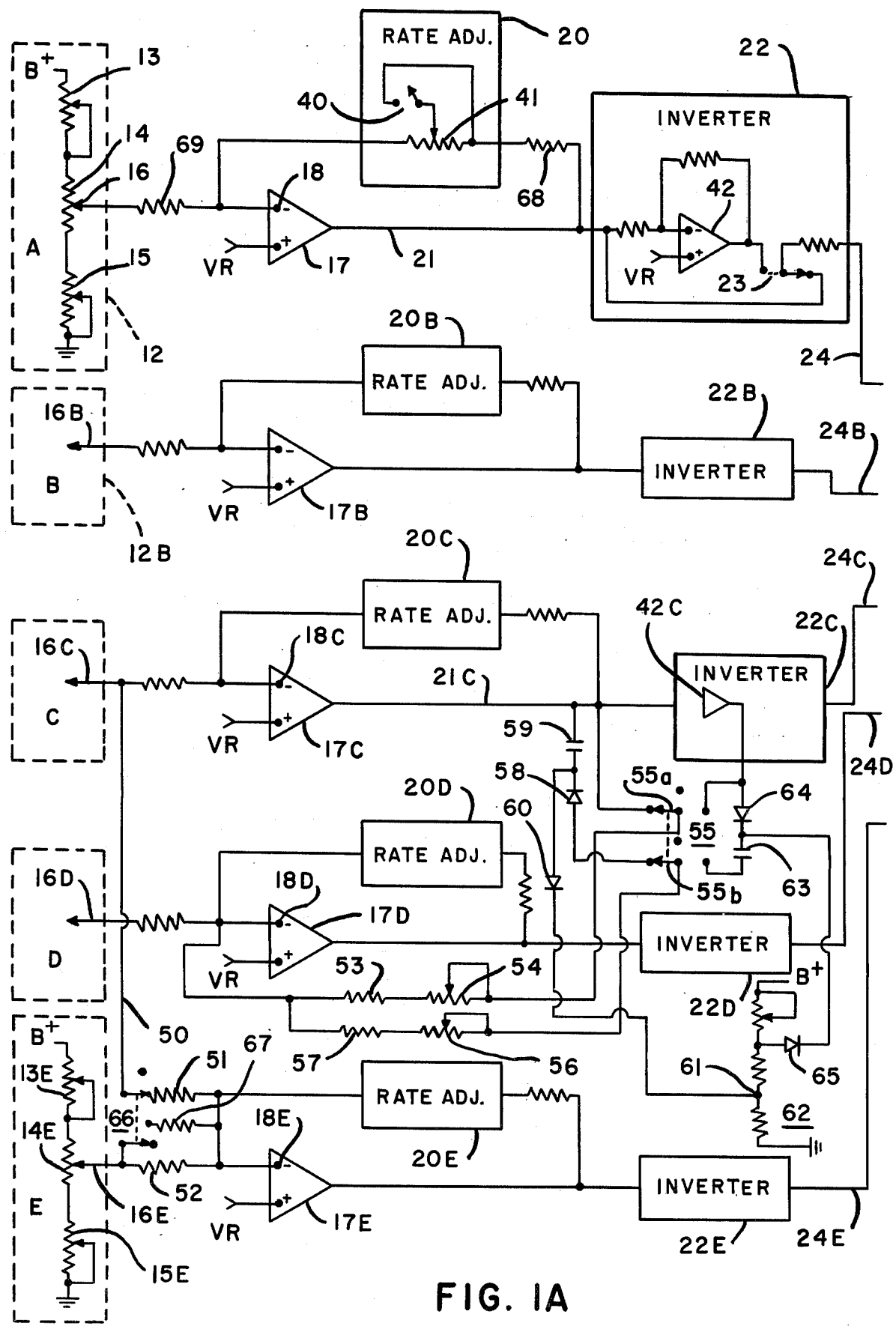

United States Patent [19]

Hellman et al.

[11] 4,158,812

[45] Jun. 19, 1979

[54] RADIO TRANSMITTER WITH INTERMIXED CONTROLS

[75] Inventors: Robert R. Hellman, Bridgeport; Douglas M. French, Clinton, both of Conn.

[73] Assignee: Westport International, Milford, Conn.

[21] Appl. No.: 903,442

[22] Filed: May 5, 1978

[51] Int. Cl.² .......................................... H04B 1/034
[52] U.S. Cl. ....................................... 325/37; 343/225
[58] Field of Search .......................... 325/37; 343/225; 179/15 A, 15 BL, 15 BC

[56] References Cited

U.S. PATENT DOCUMENTS

| 2,788,476 | 4/1957 | Shaw | 325/37 |
| 3,031,603 | 4/1962 | Hills | 325/37 |
| 4,072,898 | 2/1978 | Hellman | 325/37 |

Primary Examiner—David L. Stewart
Attorney, Agent, or Firm—Ernest M. Junkins

[57] ABSTRACT

A radio control system having a plurality of individually adjustable manual controls for individually signaling the position to be assumed by each of a plurality of remotely located servo units and in which one manual control is interconnected to alter a plurality of servo signals with the extent of altering being capable of adjustment, reversing, centering and/or overshooting.

12 Claims, 2 Drawing Figures

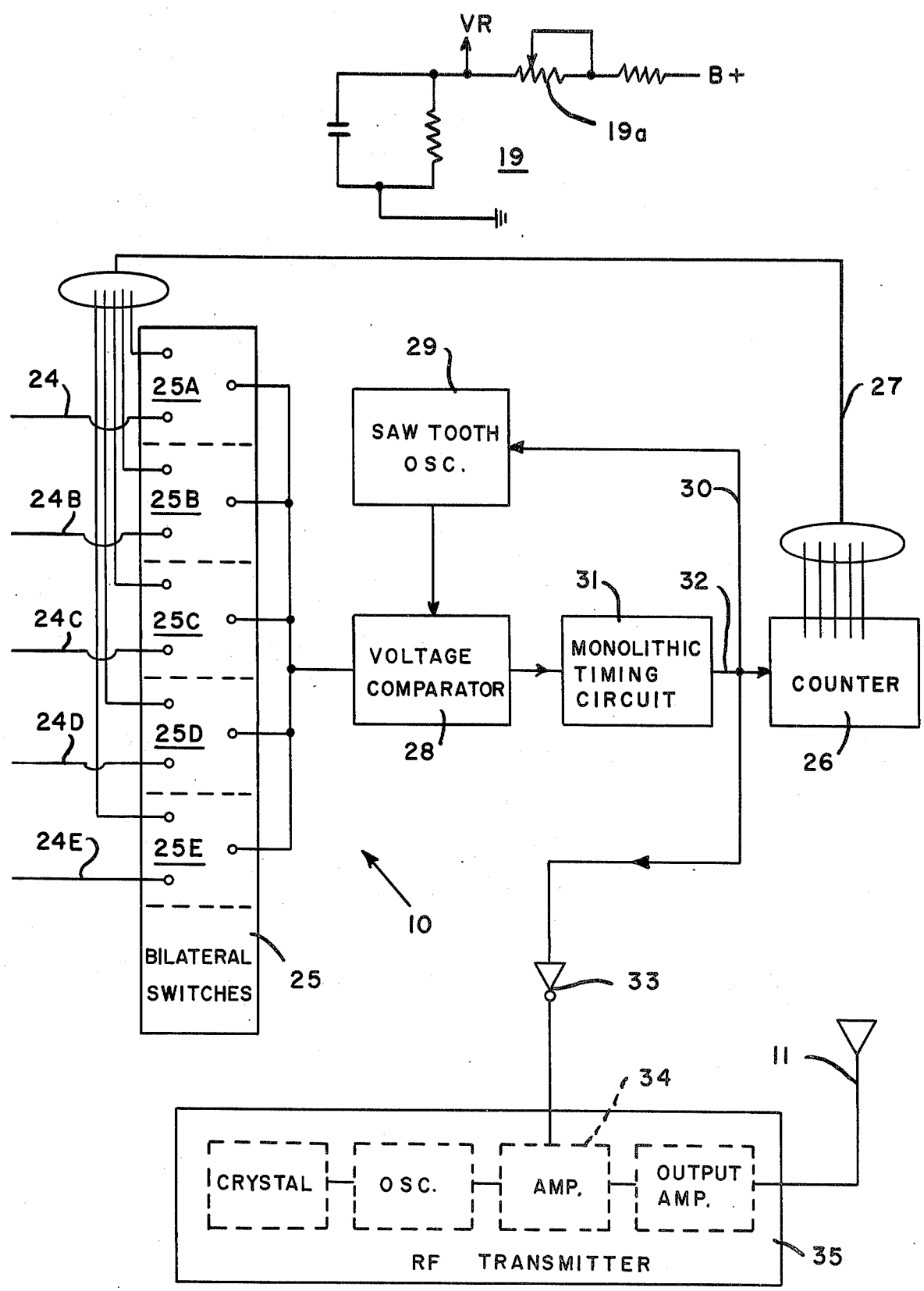
FIG. IB

RADIO TRANSMITTER WITH INTERMIXED CONTROLS

In the remote control of model crafts, such as airplanes, helicopters, boats, etc., each of the movable controls of the craft is individually operated by its own servo unit. Each servo unit responds to a signal which, as disclosed in our co-pending U.S. Pat. application, Ser. No. 604,318, now U.S. Pat. No. 4,034,277, issued July 5, 1977, may be of the type that varies in duration with the servo unit assuming a position dictated by its signal duration. The latter in turn is based on the position of a manually adjustable control which controls the signal duration broadcasted by a radio transmitter. For each control desired to be varied, there is thus accordingly a manual control with each control being independently operable with respect to each of the other controls to set its own signal duration.

While each control is desirably individually operable, in some model crafts such as helicopters, flying wings, V-tail airplanes, etc., when one control is changed to vary the position of its servo unit, a proportional change in the position of one or more other servo units may be required in order to assure a proper reaction of the craft to the first change. While a user, with agility, may operate all manual controls to effect the required simultaneous changes, it has heretofore been suggested that a second control may be interconnected with the first control so that movement of the first control will simultaneously and automatically produce a set proportional change in the second control. The interconnection may be in the transmitter so that the signal direction for the second control is varied or may be in the craft with mechanical linkages between the first servo unit and the device operated by the second servo unit.

Both types of interconnections, however, generally provide only a single ratio of movement change between the first and second controls or servo units which has been found to render such interconnection difficult to adjust to current operating conditions which may require a different ratio of movement.

It is accordingly an object of the present invention to provide a radio transmitter for a model aircraft having a plurality of individually operable controls in which at least one control is interconnected with another control to cause a change in the signal of the second control when only the first control is operated and further in which the extent and direction of the change may be easily altered solely within the transmitter.

Another object of the present invention is to achieve the above object and still further enable a third control to be changed simultaneously when the first control is altered.

A further object of the present invention is to achieve the above objects with a radio control transmitter that is economical to manufacture, requires only insignificant alterations in presently commercially available transmitters to achieve the advantages of the present invention and which is reliable and durable in use.

In accordance with the present invention, there is provided a radio transmitter which broadcasts information of the setting of a plurality of individually manually operable controls for reception by a remote craft, such as a helicopter. The craft has a plurality of operable devices, each of which is connected to a servo unit, with the transmitter information directing each servo unit to cause its operable device to assume a position that is identical to the position of its manual control. While the manual controls are independently operable, a change at one or more controls to command the model craft to execute a maneuver has been found to require some movement of the other servo units.

To achieve the required movement of the other controls with only movement of the one control, the one control is electrically interconnected with a second control and a third control to provide a change in each that is generally related to and simultaneous with the change in the first control. Thus, manual changes in either of the second and third controls are thus not simultaneously required. The interconnection to a second control provides for adjusting the neutral position with respect to the two controls and for maintaining a direct, adjustable ratio between the two controls but with the second control only being altered in one direction irrespective of which one of the two selectable directions is being used by the first control. Further, for the third control, the interconnection maintains an adjustable direct relationship but in addition, provides for an additional overshoot movement when the first control is abruptly changed in one direction only.

Other features and advantages will hereinafter appear.

In the drawing, the sole FIGURE (comprising 1A and 1B) is a block and electrical schematic diagram of the present invention on two sheets.

Referring to the drawing, the radio control transmitter of the present invention is generally indicated by the reference numeral 10 and broadcasts a radio wave through an antenna 11 which has signals that are related to the position of each of a plurality of controls A, B, C, D and E. The broadcasted signals are received by a craft that is being remotely controlled where they are decoded by a radio receiver and applied to appropriate servo units carried by the craft with there being one servo unit for each signal received. Each servo unit accordingly adjusts itself to its own signal as set by the position of its associated manual control. The control A controls the setting of the first servo unit; the control B, a second servo unit; the control C, a third servo unit; etc. In the remote craft, no particular changes are required to enable utilization of the present invention as the changes are made in the broadcasted signal.

Referring specifically to the control A, there is included within a dotted line block 12, a range resistor 13, a manual position resistor 14 and a trim resistor 15 that are connected in series between a positive B+ source and ground. The range and trim resistors 13 and 15 are adjustable in value while a tap 16 operable on the manual position resistor 14 is manually positionable by the operator and provides a voltage signal to an operational amplifier 17 that depends upon the setting of the three resistors.

The operational amplifier receives the control signal on its negative input 18 while its plus input is connected to the VR terminal of a power source generally indicated by the reference numeral 19. A rate adjustment located within a block, indicated by the reference numeral 20, is connected between the negative input 18 and an output lead 21 of the operational amplifier 17.

The output lead 21 is connected to an inverter 22 having a single pole double throw switch 23, which in the solid line position shown, effects bypassing of the inverter and directs the signal that is on the output lead 21 to a lead 24 connected to a terminal of one bilateral switch 25A of a plurality of bilateral switches 25A, 25B, 25C, etc., contained within a block 25.

The bilateral switch indicated by the reference character 25A, also receives an input from a counter 26. When the one specific count of the counter 26 occurs, as for example a count of one, on a lead 27, then the voltage signal on the lead 24 is applied through the bilateral switch 25A to a voltage comparator 28 which also receives a voltage from a saw tooth oscillator 29. The oscillator also receives on a lead 30 a command to produce a saw toothed wave for each command received.

Upon the voltage produced by the oscillator 29 and the voltage from the bilateral switch 25A becoming equal, a signal is passed to a monolithic timing circuit 31 which causes the circuit to shift its output 32 from a low voltage to a high voltage. The timing circuit is preferably a type NE555 integrated circuit that is connected to have a high output voltage for a fixed duration on the order of 0.5 milliseconds and then shift to have a low voltage for a variable duration of 0.5 to 1.5 milliseconds during which the signal voltage and the oscillator voltage become equal. When the two voltages become equal, the voltage on the timing circuit output 32 is shifted from a low to a high voltage.

The output lead 32 voltage is also directed through an inverting amplifier 33, to an amplifier 34 of an RF transmitter 35 whose output is connected to the antenna 11. The amplifier 34 constitutes part of the broadcasting transmitter 35 and whenever a low voltage is received thereat from the inverter 33, it causes the antenna 11 to broadcast at a frequency selected by the crystal shown and whenever a high voltage is received, the system does not broadcast and hence produces a silent period. Thus, this system broadcasts for a fixed duration broadcast period and remains silent for a variable duration silent period depending upon the value of the voltage to the comparator 28 from the bilateral switch 25A which in turn depends upon the setting of the resistors 13, 14 and 15 of control A with the primary change in the value of the control voltage being caused by manual movement of the tap 16.

For indexing the control of the variable duration silent period from one control to the next, the counter 26 indexes its count by one count for each low to high voltage change on the lead 32 which in turn causes the next bilateral switch in the sequence to pass the signal from its control to the comparator 28. It is also noted that the change from the high voltage to a low voltage on the output lead 32 that occurs at the termination of the fixed broadcast period causes through the lead 30, a command for the saw tooth oscillator to begin the production of its one saw toothed wave. While not shown, but well-known in the art as for example as disclosed in our previously mentioned co-pending application, there is a sequence circuit for producing a signal to cause the counter to revert to a zero count after reaching its set maximum count to enable repeating the sequence of providing a variable duration silent period and a constant duration broadcast period for each servo unit to be controlled.

Referring again specifically to control A, the range adjustment 13 provides for setting the range of voltage values of the signal that is produced for a full movement of the tap 16 to thereby correlate tap 16 movement with the variable silent period while the trim resistor 15 sets the neutral position for the tap 16. This neutral position causes the voltage to be applied to the terminal 18 of the operational amplifier 17 to be of that value of voltage which for the mid-position of the tap 16 causes the servo unit to also be at its mid-position and is generally the mid-point of the silent period range.

Even though the resistor 13 sets the range about the neutral, at times it is desired to be able to quickly and conveniently shift to a second smaller range. The present control circuit accordingly provides a switch 40 in the rate adjust block 20 which when placed in its closed position inserts an adjustable resistor 41 in the feedback path from the output 21 to the negative input terminal 18 of the amplifier 17. By altering the position of the tap of the resistor 41, the different range or voltage signal produced by full movement of the tap 16 may be effected. The rate adjust 20 enables shifting from, for example, a 100% range produced with switch 40 open to perhaps a 30% range produced when the switch 40 is closed.

In certain instances, it is desired to provide opposite movement from that produced in the servo unit by operation of the manual control 16 about its neutral position and the inverter 22 enables such reversal by operation of the switch 23. When it is in the solid-line position shown, an operational amplifier 42 connected, as shown, is bypassed. However, when the switch 23 is in its dotted-line position, it inverts the output 21, of the operational amplifier 17 to provide a voltage signal on the lead 24 that is on the other side of the neutral position but of the same extent therefrom as the signal from the output of the operational amplifier 17. The inverter 22 accordingly does not change the value of the signal from neutral but only inverts it about the neutral position so that the servo unit for the switch 23 in the solid-line position will move in one direction with a movement of the tap 16 from its neutral position while with the switch 23, in its dotted-line position, the same movement by the tap 16 will cause the servo to move in the opposite direction from the neutral position.

The other controls B, C, D and E have structure identical to the control A for providing signals to their respective bilateral switches 25B, 25C, etc. Thus, the control B includes within the dotted line block 12B, range and trim resistors and an adjustable tap 16B. Further, the tap 16B is connected to an operational amplifier 17B, a rate adjust 20B and an inverter 22B to provide the output signal on the lead 24B. Similarly, the controls C, D and E each have a manual tap 16C, 16D and 16E together with operational amplifiers 17C, 17D and 17E, rate adjusts 20C, 20D and 20F and inverters 22C, 22D and 22E with the outputs of the three controls appearing as voltage signals on output leads 24C, 24D and 24E.

When the unit is desired to control a model helicopter, the control A may operate the blade angle of the rotor for fore and aft or pitch movement; control B may change the tilt of the head for sideways or yaw movement; control C may control the power of the helicopter motor; control D may control the pitch of the tail rotor and control E may control the collective pitch of the rotor blades for up and down movement. Controls A and B for directing pitch and yaw movements can generally be operated independently to change the direction of the helicopter movement without requiring a change in the other controls. However, when control C changes the power of the motor, the pitch of the tail rotor and sometimes the collective pitch should simultaneously also be altered to maintain proper flight. To obviate a user from manually moving taps 16D and 16E when tap 16C is changed, the present invention electrically interconnects controls D and E with control C so that movement of tap 16C is capable of thus providing changes in the voltage of the leads 24D and 24E without movement of their taps. These voltage changes are adjustable to have the magnitude required for automatically producing in the tail rotor and collective pitch the necessary changes required by the change in throttle power.

With respect to control E for operating the collective pitch, it is desired to have the collective pitch proportionally increase with throttle power to maintain the motor speed constant and there is accordingly a lead 50 connected from the tap 16C to the input terminal 18E of the operational amplifier 17E through a resistor 51. Thus, as the power to the rotor increases, the collective pitch will also increase. It may be found preferred that when the transmitter 10 is used to control the helicopter, that instead of using the trim resistor 15E to correlate the neutral position of the controls C and E, that the tap 16E be used. This accordingly permits the tap 16E to control the neutral position of the collective pitch by its setting on the resistor 14E for the desired setting of the tap 16C. Moreover, it is also desired that such adjustment by the tap 16E be only a fraction of the adjustment of the range produced by the control 16C and thus the resistor 51 preferably has a value about ¼ that of a resistor 52 connected between the terminal 18E and the tap 16E. The range adjust 13E may be used to vary this fraction if desired.

For altering the tail rotor signal of control D when control C is changed, there is connected to the negative input 18D, a resistance 53 and an adjustable resistor 54 connected in series to a blade 55a of a double-pole, double-throw three position switch 55 which in the solid line position shown, effects a connection to the output lead 21C of the amplifier 17C. Accordingly, as the control C changes its output voltage, an adjustable proportion thereof is directed through the resistors 54 and 53 to the negative input 18D of the operational amplifier 17D to alter the voltage appearing on output lead 24D. It will be noted that the resistance 54 enables adjustment of the percentage of change of control C that is directed to control D.

It has also been found that when the control C is rapidly moved to increase the motor power, that there is a hesitancy on the part of the tail rotor to quickly produce the counter acting torque that is necessary in order to prevent the craft from slightly yawing. Thus, there is an initial "twitch" of the helicopter tail which has been found undesirable and in accordance with the present invention, this twitch is eliminated for rapidly increasing power conditions by producing a momentary over-reaction or overshoot of the tail rotor pitch than that which is produced by the resistors 53 and 54 with the overshoot being related to the abruptness of the throttle change. After the overshoot, the control D returns to the normal position dictated by the resistors 53 and 54. The overshoot circuit includes an adjustable resistor 56 and a fixed resistor 57 connected in series to the negative input terminal 18D and a blade 55b of the switch 55. In the solid line position of the blades, a connection is made through a diode 58 and a capacitor 59 to the output lead 21C of the operational amplifier 17C. Further, a diode 60 connects the junction of the diode 58 and capacitor 59 to a tap 61 on a voltage divider generally indicated by the reference numeral 62.

With this overshoot circuit, an abrupt decrease in the voltage on the lead 21C to increase the power to the motor will produce a rapid increase in the current drawn from the negative input 18D which in turn produces a rapid increase in the value of the output signal voltage on the lead 24D. The greater the rapidity of the change in the voltage on the lead 21C, the more rapid and the greater the extent of the overshoot. The extent and rapidity of the overshoot may be adjusted by the adjustable resistor 56. The overshoot voltage changes the decays to have the resistors 53 and 54 apply the altering voltage.

If the direction of the tail rotor is desired to be reversed, as by the inverter 22C, for the same direction of movement of the throttle, the blades 55a and 55b are moved to the dotted line position wherein the same effect is produced by capacitor 63 and diodes 64 and 65. Thus the overshoot is effective to increase the tail rotor pitch for whichever direction of movement is selected for the tap 16D.

The switch 55 has a third position, namely with the blades pointed towards the top of the drawing and in said position, the control D is disconnected from the control C. Further, a double pole switch 66 is connected between the control C and the control E and when positioned in its dotted line position, disconnects the control E from the control C. The disconnect position substitutes a resistor 67 for the resistor 51 which is identical thereto. Irrespective of whether the switches are in their disconnected or connected positions, control D and control E can each have their individual signals changed by operation of their manual control taps 16D and 16E respectively.

It should be noted that a rapid reduced power movement of the throttle control C to decrease the voltage in the output lead 21C does not cause a "twitch" condition to occur. Thus, the present overshoot circuit does not become effective and the change in the voltage in the output lead 24d is caused only by the steady state circuit of resistors 53 and 54 for such a movement.

Each of the operational amplifiers are preferably type LM 324 integrated circuits and all are connected in a manner so as to operate as inverting amplifiers. The reference voltage VR is connected to the non-inverting plus input terminals of each of the operational amplifiers and is capable of adjustment, as by a resistor 19a in the power supply 19 so as to enable setting the neutral positions of the controls with the midpoint in the silent period range of the broadcasted wave. It is also noted that the operational amplifiers in the invention basically function as unitary inverters, not amplifiers, in view of the resistance between the output and the inverting terminal which includes resistors 68 and 41 in control A having the same resistance as a resistor 69 connected between the tap 16 and the negative terminal 18.

It will accordingly be understood that there has been disclosed a radio transmitter for remotely controlling a model aircraft. Though the transmitter has a plurality of individually operable controls, it further electrically interconnects one control to provide for simultaneous changes in two other controls when the one control is operated, thereby effecting a proper reaction of the controlled model craft to the change dictated by the change in the one control.

Variations and modifications may be made within the scope of the claims and portions of the improvements may be used without others.

We claim:

1. A radio transmitter for providing broadcast control signals to a remote model craft that are related to the setting of manual controls with there being one manual control for each control signal comprising a first manual control means for producing a first electrical command having a value related to its setting, a second manual control means for producing a second electrical command having a value related to its setting and a third manual control means for producing a third electrical command having a value related to its setting, means interconnecting the first control means and the second control means for altering the value of the second command in accordance with changes in the value of the first command, means interconnecting the first control means and the third control means for altering the value of the third command in accordance with changes in the first command and means for broadcasting control signals related to the values of each of the commands.

2. The invention as defined in claim 1 in which the interconnecting means between the first and second control means normally provides a related alteration between the values of the two commands and in which the interconnecting means further includes means for momentarily increasing the extent of alteration of the value of the second command when the value of the first command is changed abruptly.

3. The invention as defined in claim 2 in which the means for increasing includes means that are rendered operative only for abrupt alterations in the value of the first command in one direction only.

4. The invention as defined in claim 2 in which the interconnecting means between the first and second control means includes means for inverting the direction of the alteration in the value of the second command with respect to the direction of alteration of value in the first command.

5. The invention as defined in claim 2 in which the first control means includes means for selecting either direction of alteration of the value of the first command for the same manual movement and in which the interconnecting means between the first and third control means includes means for altering the value of the third command only in one direction for the same manual movement.

6. The invention as defined in claim 1 in which the interconnecting means between the first and second control means includes means for adjusting the proportion of the altering of the value of the second command with an alteration in the value of the first command.

7. The invention as defined in claim 1 in which the first control means alters the value of the first command about a neutral value and in which the third control means includes means for adjusting the value of the third command for the neutral value of the first voltage.

8. The invention as defined in claim 1 in which the interconnecting means between the first and second control means includes switch means for disconnecting the second control from the first control means.

9. The invention as defined in claim 1 in which the interconnecting means between the first control and the third control includes switch means for disconnecting the third control means from the first control means.

10. The invention as defined in claim 1 in which the second control means has a manually movable member for altering the value of the second command independently of the first control.

11. The invention as defined in claim 1 in which the third control means has a manually movable member for altering the value of the third command independently of the first control.

12. A radio transmitter for providing broadcast control signals to a remote model craft that are related to the setting of manual controls with there being one manual control for each control signal comprising a first manual control means for producing a first electrical command having a value related to its setting, a second manual control means for producing a second electrical command having a value related to its setting, means interconnecting the first control means and the second control means for altering the value of the second command in accordance with changes in the value of the first command, said interconnecting means including means for momentarily altering the second command an extent that is also related to the rapidity of change of the value of the first command and means for broadcasting control signals related to the value of the commands.

* * * * *